United States Patent [19]

Miller

[11] 4,157,814
[45] Jun. 12, 1979

[54] CUTTING ATTACHMENT FOR WELDING TORCHES

[76] Inventor: Louis E. Miller, 409 E. 13th, Odessa, Tex. 79761

[21] Appl. No.: 841,589

[22] Filed: Oct. 12, 1977

[51] Int. Cl.² .............................................. B23K 7/10
[52] U.S. Cl. ...................................................... 266/70
[58] Field of Search .......... 266/70; 74/89.15, 424.8 R, 74/499, 507

[56] References Cited

U.S. PATENT DOCUMENTS

| | | | |
|---|---|---|---|
| 2,323,298 | 7/1943 | Cook | 266/70 |
| 2,346,172 | 4/1944 | Lennon et al. | 74/509 |
| 2,964,969 | 12/1960 | Eckert | 74/509 |
| 3,139,471 | 6/1964 | Root | 266/70 X |
| 3,804,391 | 4/1974 | Case | 266/70 |

*Primary Examiner*—Gerald A. Dost
*Assistant Examiner*—Paul A. Bell
*Attorney, Agent, or Firm*—Victor J. Evans & Co.

[57] ABSTRACT

Disclosed herein is an apparatus for attachment to a conventional welding torch which provides a support and a template for cutting portions of arcs or full arcs. The apparatus includes a nesting mechanism and constraint for retaining the torch cutting assembly and an adjustable template for causing the cutting torch tip to translate in a circular fashion. Various adjustments are provided for changing the radius of the circle and correcting for out of round conditions by means of a vernier.

5 Claims, 7 Drawing Figures

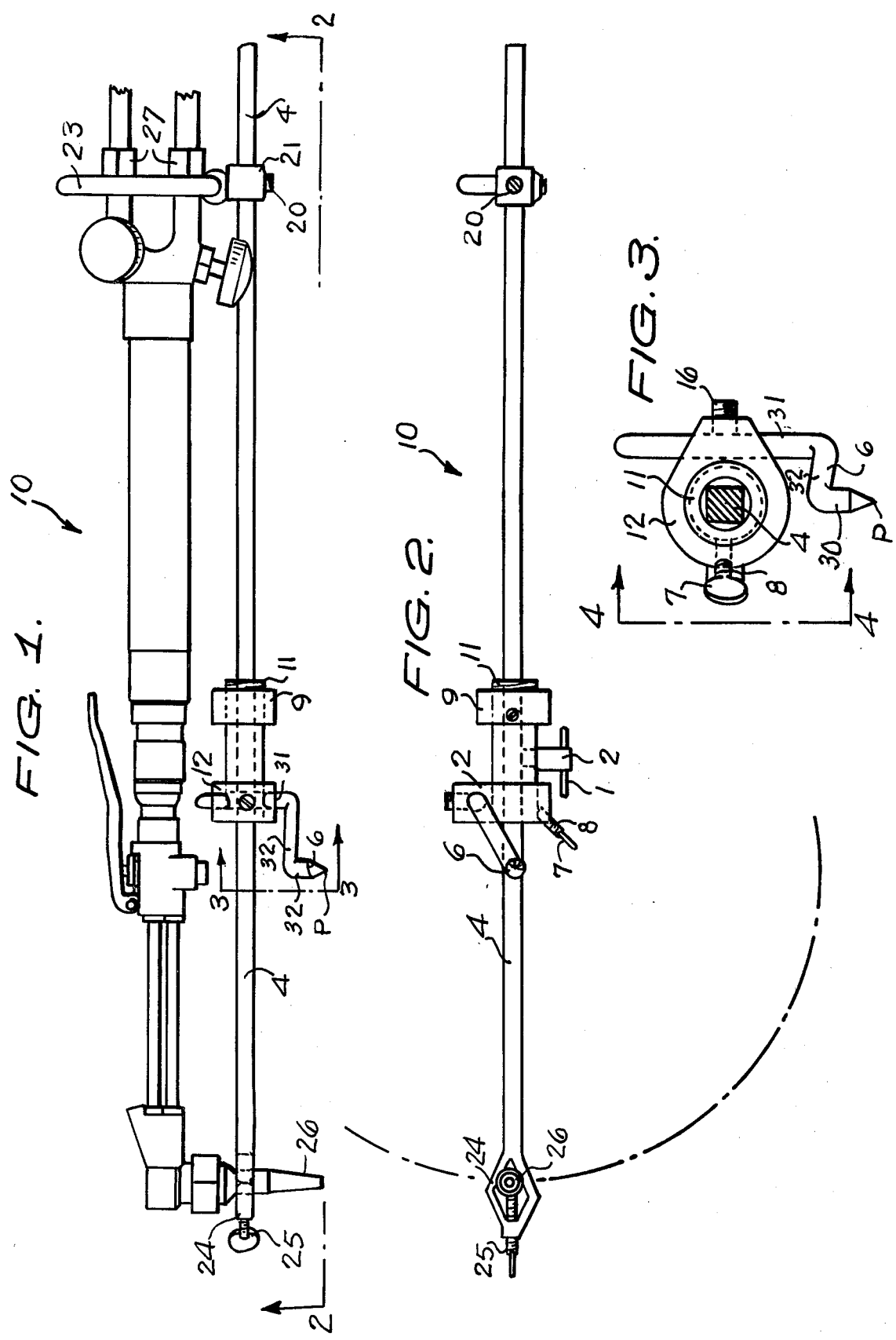

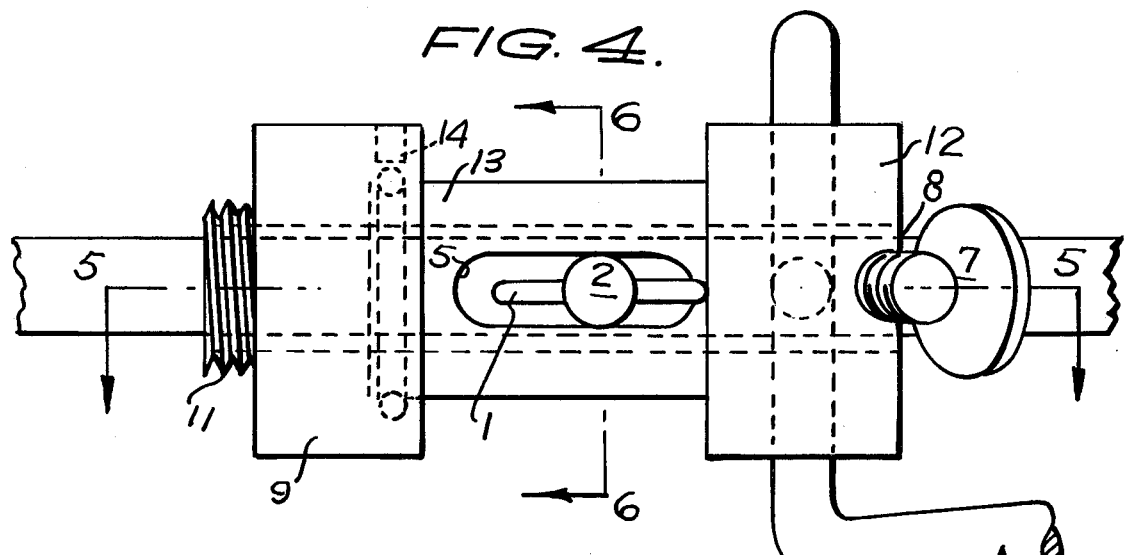
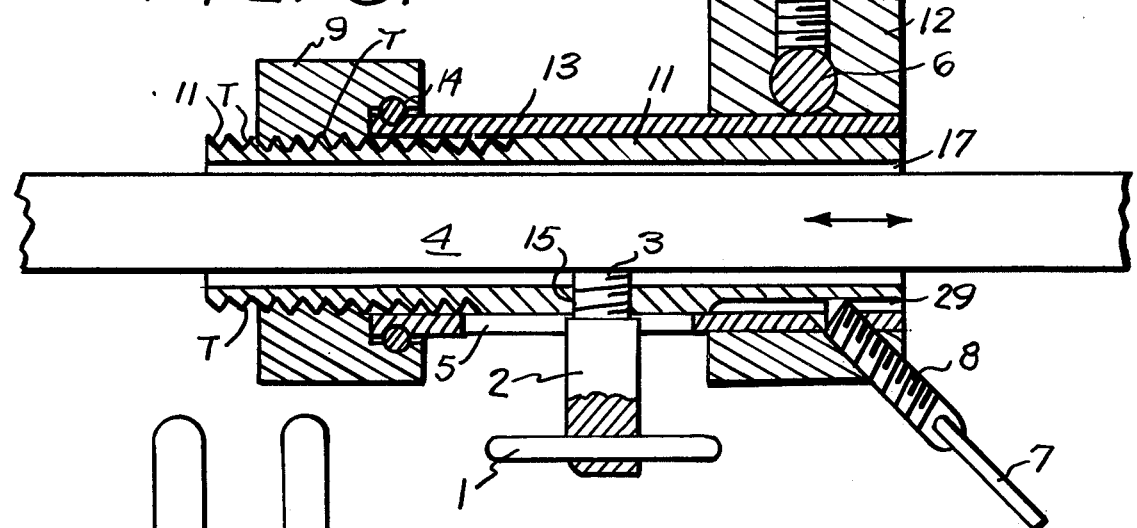
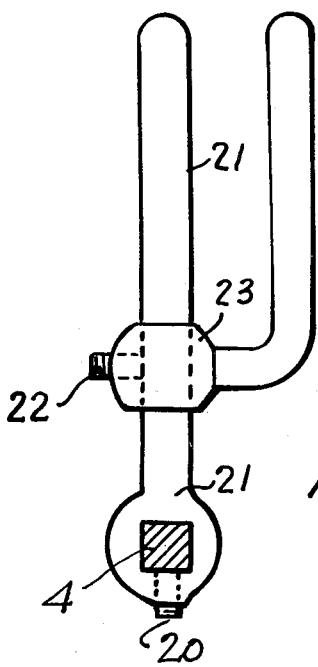
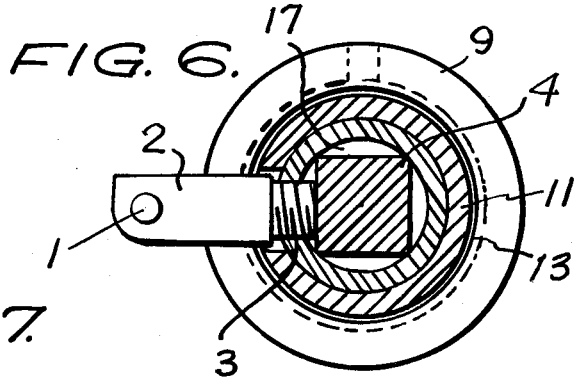

CUTTING ATTACHMENT FOR WELDING TORCHES

BACKGROUND OF THE INVENTION

FIELD OF THE INVENTION

Perhaps the most difficult skill to be acquired by a welder is to cut circles with a cutting torch to close tolerances. Prior art devices have been developed which make an attempt at cutting circles which have adjustable features, and these patents include U.S. Pat. Nos. 1,495,994, 1,792,317, 2,323,298, 2,452,718 and 2,688,190.

They can all be characterized by the following limitations. They are quite complex and are difficult to adjust therefore creating unnecessary demands upon the user in terms of time and cost expenditure, and further are limited in accuracy by virtue of the inherent play in these complex mechanisms.

SUMMARY OF THE INVENTION

Accordingly the following detailed specification is directed to a cutting attachment for welding torches which is simple in design, easy to orient, and accurate regarding the ability to cut the very close tolerances.

Accordingly it is an object of this invention to provide a cutting attachment for torches which is easy to adjust.

Another object contemplates providing a cutting attachment for welding torches that is accurate to very close tolerances, that is less than a few thousandths.

A further object contemplates providing an apparatus for welding torches which cut in a circular fashion that is simple inexpensive and reliable.

Other objects and advantages will become apparent in the following specification when considered in light of the attached drawings.

BRIEF DESCRIPTION OF THE DRAWINGS

FIG. 1 is a side view of a cutting torch and the attachment assembly according to the present invention;

FIG. 2 is a bottom view of that shown in FIG. 1 taken along lines 2—2 thereof;

FIG. 3 is a sectional view of a portion of the apparatus shown in FIG. 1 taken along lines 3—3 thereof;

FIG. 4 is a side view taken along lines 4—4 of FIG. 3;

FIG. 5 is a sectional view taken along lines 5—5 of FIG. 4;

FIG. 6 is a sectional view taken along lines 6—6 of FIG. 4; and

FIG. 7 is a depiction of the nesting arrangement of the cradle which holds a portion of the torch.

DESCRIPTION OF THE PREFERRED EMBODIMENT

Referring to the drawings now in which like reference numerals refer to like parts throughout, reference numeral 10 is directed to the torch and support assembly according to the present invention.

The torch is of conventional configuration and will not be discussed herein other than noting that the cutting or welding tip 26 is located at one extremity, and the gasline inputs denoted by reference numerals 27 are disposed at the other extremity. The support means carrying this torch and allowing the torch to cut in a circular fashion constrains the torch at these two points as is best seen in FIGS. 1 and 2. It will be noted that the cutting tip 26 of FIG. 2 is supported by a bar 4 having preferably a square configuration but may be fashioned in any geometrical manner that is economical from a point of view of stock material and the end proximate to the cutting tip changes from its rectangular or square configuration to a diamond shaped support member 24 which surrounds the cutting tip. The cutting tip 26 is constrained within the diamond shaped support by means of a thumb screw 25 threadedly disposed through the diamond shaped extremity of the support bar as is well known in the art. The extremity of the torch remote from the cutting tip in which the gaslines feeding the torch form a U-shaped member and focused in FIG. 1 by reference numerals 27 is supported in a cradle best seen in FIG. 7 and can be described as follows: the bar 4 provides the support for the cradle 21 which is fastened to the bar 4 by means of a set screw 20. Adjustably and slidably disposed on member 21 is an L-shaped finger 23 which is fastened to the upstanding member 21 by means of a second set screw 22. The area between members 21 and 23 define a fork or U-shaped expanse in which the gaslines 27 can be nested. These two supports are seen to be equally attachable to the cutting torch and yet be quite effective in constraining and supporting the torch so that the torch can be used to scribe a circle by virtue of the subsequent apparatus now to be explained.

Disposed on bar 4 substantially medially between the two aforementioned torch supports, is an assembly which causes the torch to cut in a circle or a portion of a circle. The actuation for this scribing constraint is best seen in FIGS. 4, 5 and 6 as far as the structural details and an overview can be obtained in FIGS. 1 and 2. Member 6 can best be described as having a point P which terminates in short manner and extends orthogonally to the rest of circle scribing mechanism 6 in an orthogonal direction. That is to say member 6 is basically V-shaped having a bar member 32 upon which a point P is connected at one extremity through arm 30 and at the other extremity 32 is the support leg 31 which is fastened to a collar 12 via set screw 16 as best seen in FIG. 3. Set screw 16 is tightened sufficiently to retard displacement of the point P relative to the cutting torch tip 26 so that they are both substantially in the same horizontal plane as seen in FIG. 1 and is loose enough to allow point P to serve as the center of a circle around which leg 32 acts as a sweeping radian. Therefore cutting tip 26 will generate a circle in which the radius will substantially approximate the length of arm 32, and leg 31 will revolve with cutting tip 26 in a parallel fashion. It will be appreciated that this circle scriber 6 can have a medial leg 32 of various dimensions so that circles of different radii can be cut with just simple change of this V-shaped member.

To form the complete constraint that causes the cutting tip 26 to revolve predictably in the same fashion as V-shaped arm 6 point P is best inserted in a hole which has been provided by drilling or tapping to assure that it does not drift during the actual cutting operation. The mechanism which constrains the cutting tip and adjusts it relative to the point P will now be explained in detail and can be observed in FIGS. 4, 5 and 6.

Surrounding square shaft 4 is a sleeve member 11 having a circular inner configuration relative to the bar 4 and on its outer periphery of this sleeve is disposed at one end threads denoted by the reference numeral T. Portions of the area between rod 4 and sleeve 11 will have therefore open areas 17 since the sleeve member 11 is circular and the rod is square. Surrounding the sleeve 11 and having a substantially circular inner and outer configuration is a retaining collar 13 having one side thereof provided with a cutaway slot portion 5. Disposed within this slot slidably of course is a locking key having a winged outer tab to allow rotation of this key, a shaft 2 extending into the slot and having a lip thereon which abuts against sleeve 11 and a threaded portion 3 which mates with complementally formed threads 15 on the sleeve 11. The threaded portion 3 extends through the sleeve and is caused to ride against the square bar 4 and when tightened thereagainst will retard relative motion of the bar 4 and the sleeve 11. Proximate to the end of the collar 13 nearest the threads T of sleeve 11 there is disposed on the collar 13 a flange member 14 in a circumferential fashion. Overlying this flange and constrained thereby is an adjusting nut 9 having threads complementally formed to coact with the threads T of sleeve 11. At the extremity remote from the flange rim member 14 of the collar 13 it will be noted that the collar 13 provides a support for the V-shaped scribe assembly 6 through block member 12 which surrounds this end of collar 13 and is fastened thereto by means of screw 8 which is turnable by tab portion 7. The screw 8 is threadedly disposed in block 12 and collar 13 and serves to provide a secondary finer adjustment in a manner now to be explained.

It will be noted that there is an air space 29 defined by a cutaway portion of sleeve 11 where the screw 8 coacts with block 12 and collar 13. This slot 29 or keyway allows for a further linear adjustment when the screw 8 is removed slightly by rotation of tab 7 outwardly.

The sequencing of the alignment procedure will now be outlined. First an appropriate V-shaped constraining member 6 is selected and disposed within the block member 12. Then the relative placement of this entire assembly on bar 4 is brought about by tightening the screw thread 3 against the bar 4. At this time a trial cut is made in which the torch is allowed to traverse the circle in light fashion to determine the accuracy. The circle is then inspected to determine whether the trial cut is a few thousandths too big or too small. Then if it is determined that the circle requires a minor adjustment, the tab 7 on the screw 8 is turned to release the binding between sleeve 11, collar 13 and block 12. Rotation of the nut 9 will now provide a fine linear translation of sleeve 11 in the directions of the arrows shown in FIG. 5 so that a minor revision or vernier adjustment of a few thousandths up to 3/16th of an inch can be accomplished. Since screw member 3 is firmly affixed to the bar 4, and since nut 9 is constrained from axial displacement by virtue of the flange rim 14, and in view of the fact that the initial tightening adjustment member 12 is provided with a slot 5 on collar 13, rotation of the nut 9 will provide a pure linear translation of the sleeve 11 relative to the point P of the V-shaped arm 6. The slot 29 between sleeve 11 and collar 13 and block 12 will provide the minor change or adjustment of a few thousandths that is necessary and when this has been done, screw 8 is reinserted and constraining against the sleeve 11 to assure a static condition whereby a circle of the proper diameter will be scribed.

It should be noted that the support for member 6 can be inverted on the bar 4 to make adjustments convenient for left handed welders.

Having thus described the preferred embodiment of the invention it should be understood that numerous structural modifications and adaptations may be resorted to without departing from the spirit of the invention.

What is claimed is:

1. A cutting attachment for a welding torch to cause the torch to oscillate in a circular path comprising in combination: a bar, means at remote extremities of said bar to hold and constrain a cutting torch, a sleeve overlying said bar having a threaded hole extending therethrough and threads on one end of an outer periphery of said sleeve, a collar overlying said sleeve having an elongate axially extending slot overlying the threaded hole of said sleeve and a flanged rim circumferentially upstanding at an extremity of said collar proximate to the threaded end of said sleeve; an inner threaded nut engaging the threads of said sleeve, said nut having a portion which overlies said flanged rim of said collar, a shaft threadedly fastened within said threaded hole of said sleeve locked to said bar, a block supporting a pivot point fastened on said collar and releaseable locking means connecting said block and collar to said sleeve whereby when said releaseable means is loosened said nut serves as a vernier adjustment translating said collar it's supported block and therefore said pivot point axially, and when said releaseable means is tightened, said nut is inoperable.

2. The device of claim 1 in which said releaseable means comprises a threaded bore extending through said collar and block, an air space between said collar and sleeve at the threaded bore and a threaded screw extending through said collar and block, whereby said threaded screw abuts against said sleeve said nut is inoperative.

3. The device of claim 2 in which said pivot point is carried on said block through a rotatable support leg orthogonal to said bar carried on said block, whereby said support leg terminates into a substantially V-shaped pivot point.

4. The device of claim 1 wherein said means for constraining and supporting said torch include a diamond shaped support member surrounding the cutting tip of a torch.

5. The device of claim 4 wherein said support for said torch further includes a U-shaped cradle slidably disposed on said bar oriented to carry said torch at the extremity remote from the cutting tip of said torch.

* * * * *